United States Patent
Visweswara et al.

(10) Patent No.: US 11,228,213 B2
(45) Date of Patent: Jan. 18, 2022

(54) POWER TRANSMITTER AND METHOD OF OPERATION THEREFOR

(71) Applicant: KONINKLIJKE PHILIPS N.V., Eindhoven (NL)

(72) Inventors: Ashoka Sathanur Visweswara, Amstelveen (NL); Wilhelmus Gerardus Maria Ettes, Leeuwarden (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 17/256,707

(22) PCT Filed: Jun. 25, 2019

(86) PCT No.: PCT/EP2019/066731
§ 371 (c)(1),
(2) Date: Dec. 29, 2020

(87) PCT Pub. No.: WO2020/007640
PCT Pub. Date: Jan. 9, 2020

(65) Prior Publication Data
US 2021/0265876 A1    Aug. 26, 2021

(30) Foreign Application Priority Data
Jul. 3, 2018   (EP) .................................... 18181499

(51) Int. Cl.
*H02J 50/90*  (2016.01)
*H02J 50/80*  (2016.01)
(Continued)

(52) U.S. Cl.
CPC .............. *H02J 50/90* (2016.02); *H02J 50/12* (2016.02); *H02J 50/80* (2016.02); *H02J 50/402* (2020.01)

(58) Field of Classification Search
CPC ....................................................... H02J 50/90
(Continued)

(56) References Cited

U.S. PATENT DOCUMENTS

2011/0196544 A1   8/2011  Baarman et al.
2012/0235506 A1*  9/2012  Kallal ..................... H02J 50/90
                                                      307/104
(Continued)

FOREIGN PATENT DOCUMENTS

WO   2015144389 A1   10/2015

OTHER PUBLICATIONS

International Search Report and Written Opinion From PCT/EP2019/066731 dated Aug. 23, 2019.
QI Specification Version 1.2.2. Apr. 2016.

*Primary Examiner* — Joseph Chang

(57) ABSTRACT

A power transmitter (101) for wirelessly providing power to a power receiver (105) comprises a retriever (209) retrieving calibration data comprising a set of calibration parameters for each of a plurality of spatial positions of a calibration receiver relative to a calibration transmitter. A test generator (207) generates a test drive signal for a transmitter coil (103) to generate an electromagnetic test signal, and a test processor (213) determines a set of test parameters in response to the test drive signal. A position estimator (207) estimates a position of the power receiver relative to the power transmitter in response to a comparison of the test parameters to the calibration parameters for the plurality of spatial positions. The parameters include a power loss measure, a resonance frequency measure, and a coupling measure. The approach and specific parameters provide a substantially improved position estimation.

20 Claims, 10 Drawing Sheets

(51) Int. Cl.
  *H02J 50/12*    (2016.01)
  *H02J 50/40*    (2016.01)
(58) Field of Classification Search
  USPC .......................................................... 307/104
  See application file for complete search history.

(56) References Cited

U.S. PATENT DOCUMENTS

| | | |
|---|---|---|
| 2013/0257168 A1 | 10/2013 | Singh |
| 2016/0094043 A1 | 3/2016 | Hao et al. |
| 2016/0149440 A1* | 5/2016 | Staring .................. H02J 50/12 |
| | | 307/104 |
| 2016/0248280 A1 | 8/2016 | Ben-Shalom et al. |
| 2017/0018977 A1 | 1/2017 | Van Wageningen et al. |
| 2018/0159382 A1 | 6/2018 | Lin et al. |

\* cited by examiner

POWER TRANSMITTER AND METHOD OF OPERATION THEREFOR

CROSS-REFERENCE TO PRIOR APPLICATIONS

This application is the U.S. National Phase application under 35 U.S.C. § 371 of International Application No. PCT/EP2019/066731, filed on Jun. 25, 2019, which claims the benefit of EP Patent Application No. EP 18181499.7, filed on Jul. 3, 2018. These applications are hereby incorporated by reference herein.

FIELD OF THE INVENTION

The invention relates to operation of a wireless power transfer system and in particular, but not exclusively, to estimation of a relative position of a wireless power receiver in a wireless power transfer system, such as a Qi wireless power transfer system.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

In power transfer systems, such as Qi, the electromagnetic field generated to transfer the required levels of power to the power receiver is often very substantial. The presence of such a strong field may in many situations have an impact on the surroundings. For example, a potential problem with wireless power transfer is that power may unintentionally be transferred to e.g. metallic objects that happen to be in the vicinity of the power transmitter.

In wireless power transfer systems, it is important to achieve a high efficiency of the power transfer. A highly efficient wireless power transfer system achieves a high coupling factor ($\kappa$) between the transmitter and receiver coils, and it is desired for the coupling factor $\kappa$ to be as close to 1 is possible. To achieve a high coupling factor, the receiver coil needs to be placed very close to transmitter coil and the coils should preferably be perfectly aligned.

A proper or perfect alignment may further provide other advantages. For example, if the alignment is optimal, the operating parameters may be closer to the nominal or expected operating point, and this may facilitate some operations such as for example communication or detection of the presence of metallic objects.

However, for most practical systems, it cannot be guaranteed that the alignment will be optimal. For the vast majority of currently envisaged applications, the user will have a degree of freedom in the positioning of the power receiver device on the power transmitter device (e.g. when placing a mobile phone on a wireless charger). Therefore, the coils cannot be guaranteed to be, and indeed typically are not, completely aligned, and this may lead poor coupling resulting in e.g. longer charging time, wastage of power, heating of friendly metal in the receiver, and other inconveniences to the user.

It is typically not practical to restrict the placement of the power transmitter and power receiver such that perfect alignment is assured. However, if the misalignment is known, various approaches can be employed e.g. to compensate for such misalignment or to provide feedback allowing the alignment to be improved.

Hence, an improved approach for determining a position of a power receiver relative to a power transmitter would be advantageous, in particular, an approach allowing increased flexibility, reduced cost, reduced complexity, improved position estimation, improved communication, improved accuracy, improved adaptability, backwards compatibility, improved power transfer operation, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver via an electromagnetic power transfer signal; the power transmitter comprising: at least one transmitter coil for generating the power transfer signal during power transfer; a retriever for retrieving calibration data comprising a set of calibration parameters for each of a plurality of spatial positions of a calibration receiver relative to a calibration transmitter, the calibration parameters including for each spatial position of the plurality of spatial positions: a calibration power loss measure for the calibration power receiver being at the spatial position, a calibration resonance frequency measure indicative of a resonance circuit of the calibration power transmitter for the calibration power receiver being at the spatial position, a calibration coupling measure indicative of a coupling between the calibration transmitter and the calibration receiver being at the spatial position; a test generator for generating a test drive signal for the transmitter coil to generate an electromagnetic test signal; a test processor for determining a set of test parameters in response to the test drive signal, the test parameters comprising: a test power loss measure indicative of a power extracted from the electromagnetic test signal, a test resonance frequency measure for a resonance circuit comprising the transmitter coil, a test coupling measure indicative of a coupling between the power transmitter and the power receiver; and a position estimator for estimating a position of the power receiver relative to the power transmitter in response to a comparison of the test parameters to the calibration parameters for the plurality of spatial positions.

The invention may provide improved and/or facilitated position estimation of a relative position of a power receiver. The approach may generate a position estimate indicative of a misalignment or displacement of a receiver coil relative to the transmitter coil. The approach may provide an accurate detection in many embodiments, including an estimation of a three dimensional or two dimensional misalignment. The approach may be particularly efficient in many practical wireless power transfer systems that include different types of power transmitters and power receivers.

The position estimate may for example be used to generate a user feedback and/or may e.g. be used to compensate other operations for the misalignment.

The position estimate may specifically be indicative of a position of a receiver coil of the power receiver relative to the transmitter coil.

The test power loss measure, the test resonance frequency measure, and the test coupling measure may provide different relationships with a position of the power receiver relative to the power transmitter in terms of a function between the position and the measures being different for the different measures. The interrelationship between the test power loss measure, the test resonance frequency measure, and the test coupling measure may provide an additional indication of the position of the power receiver relative to the power transmitter in terms of the combination providing additional information on the position than provided by only one of the measures. The different relationships may for example allow facilitated and/or improved position estimation for different degrees of misalignment, e.g. one measure may be more suitable for relatively small misalignments whereas another measure may be more suitable for relatively large misalignments.

The position estimation may generate the position estimate to reflect a degree of misalignment between the power transmitter and the power receiver.

The comparison by the position estimator may for example comprise generating a cost measure for each spatial position of the plurality of spatial positions using a cost function which is a monotonically increasing function of a difference between the test power loss measure and the calibration power loss measure, is a monotonically increasing function of a difference between the test resonance frequency measure and the calibration resonance frequency measure, and/or is a monotonically increasing function of a difference between the test coupling measure and the calibration coupling measure. The position estimator may in such examples determine the spatial position in response to cost measures for the plurality of spatial positions, such as for example setting the position estimate based on the spatial position having the lowest cost value.

In accordance with an optional feature of the invention, the position estimator is arranged to determine a perpendicular distance measure indicative of a distance between the transmitter coil and a receiver coil of the power receiver in a direction perpendicular to a contact surface for receiving the power receiver; and to determine the position of the power receiver in response to a comparison of the perpendicular distance measure to the plurality of spatial positions of a calibration receiver.

This may provide improved performance in many embodiments and scenarios. For example, it may provide improved performance in many practical applications where the placement of the power receiver is more restricted in one direction than in other directions.

The position estimator may for example consider the perpendicular distance measure by using this in the comparison, or may e.g. constrain the spatial positions that are considered, e.g. by only considering spatial positions which match the perpendicular distance measure.

In accordance with an optional feature of the invention, the power transmitter comprises a communicator for receiving messages from the power receiver; wherein the communicator is arranged to receive a comprising a power receiver distance indicator indicative of a distance from the receiver coil to an external surface of the power receiver; and wherein the position estimator is arranged to determine the perpendicular distance measure in response to the power receiver distance indicator.

This may provide a particularly advantageous approach and may specifically provide an efficient way for the power transmitter to adapt to many different power receivers thereby improving compatibility.

In accordance with an optional feature of the invention, the power transmitter comprises a communicator for receiving messages from the power receiver; wherein the communicator is arranged to receive a power receiver identification indication from the power receiver and the retriever is arranged to retrieve calibration data matching the power receiver identification indication.

This may be advantageous in many applications and may allow a system wherein the position estimation may be adapted to different power receivers. The approach may allow a wireless transfer system with efficient interworking between many different types of power receivers and power transmitters.

The power receiver identification indication may be a device specific power receiver identification indication or may e.g. be a type specific power receiver identification indication.

In accordance with an optional feature of the invention, the retriever is arranged to retrieve the calibration data from a remote source by transmitting a calibration data request message to the remote source, the calibration data request message comprising an identification indication corresponding to the power receiver identification indication. This may provide advantageous performance in many embodiments and may for example provide an efficient and flexible approach for enabling a wireless power transfer system to support many different power receivers and power transmitters.

In accordance with an optional feature of the invention, the power transmitter further comprises a communicator for receiving data from the power receiver; wherein the retriever is arranged to receive the calibration data from the power receiver.

This may provide advantageous performance in many embodiments and may for example provide an efficient and flexible approach for enabling a wireless power transfer system to support many different power receivers and power transmitters.

In accordance with an optional feature of the invention, at least some of the calibration parameters are provided for a calibration power receiver having a disconnected load.

This may provide an improved and typically more accurate position estimation in many embodiments. The determination of the test parameters may correspondingly be performed with the power receiver having the load disconnected.

In accordance with an optional feature of the invention, the calibration data is provided for a reference power transmitter.

This may in many embodiments provide an efficient operation for a wireless power transfer system that includes many different types of power transmitters.

In accordance with an optional feature of the invention, the position estimator is arranged to modify at least one of at least one calibration parameter and a test parameter in response to a difference between a property of the power transmitter and a property of the reference power transmitter.

This may provide improved position estimation in many scenarios and may enable or facilitate efficient operation for a wireless power transfer system that includes many different types of power transmitters.

In accordance with an optional feature of the invention, the test generator is arranged to generate a plurality of different test signals, and the calibration data comprises a plurality of calibration parameters for different test signals for one spatial position.

This may provide improved position estimation in many scenarios and applications. The position estimator may be arranged to estimate the position of the power receiver in response to a comparison of the test parameters to the plurality of calibration parameters for different test signals.

In accordance with an optional feature of the invention, the power transmitter comprises a plurality of transmitter coils including the transmitter coil, and the test generator is arranged to generate test signals for the plurality of transmitter coils.

This may provide improved position estimation in many scenarios and applications.

In accordance with an optional feature of the invention, the test generator is arranged to generate a sequence of sets of test signals comprising different test signals for different transmitter coils of the plurality of transmitter coils, and the calibration data comprises a plurality of calibration parameters for different sets of test signals for one spatial position.

This may provide improved position estimation in many scenarios and applications. The position estimator may be arranged to estimate the position of the power receiver in response to a comparison of the test parameters to the plurality of calibration parameters for different sets of test signals.

In accordance with an optional feature of the invention, at least two sets of the sets of test signals comprise test signals for different subsets of the transmitter coils.

This may provide improved position estimation in many scenarios and applications.

In accordance with an optional feature of the invention, e position estimator is arranged to estimate at least two dimensions for the position of the power receiver.

According to an aspect of the invention there is provided a method of operation for a power transmitter wirelessly providing power to a power receiver via an electromagnetic power transfer signal generated by a transmitter coil; the method comprising: retrieving calibration data comprising a set of calibration parameters for each of a plurality of spatial positions of a calibration receiver relative to a calibration transmitter, the calibration parameters including for each spatial position of the plurality of spatial positions: a calibration power loss measure for the calibration power receiver being at the spatial position, a calibration resonance frequency measure indicative of a resonance circuit of the calibration power transmitter for the calibration power receiver being at the spatial position, a calibration coupling measure indicative of a coupling between the calibration transmitter and the calibration receiver being at the spatial position; generating a test drive signal for the transmitter coil 103 to generate an electromagnetic test signal; determining a set of test parameters in response to the test drive signal, the test parameters comprising: a test power loss measure indicative of a power extracted from the electromagnetic test signal, a test resonance frequency measure for a resonance circuit comprising the transmitter coil, a test coupling measure indicative of a coupling between the power transmitter and the power receiver; and estimating a position of the power receiver relative to the power transmitter in response to a comparison of the test parameters to the calibration parameters for the plurality of spatial positions.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
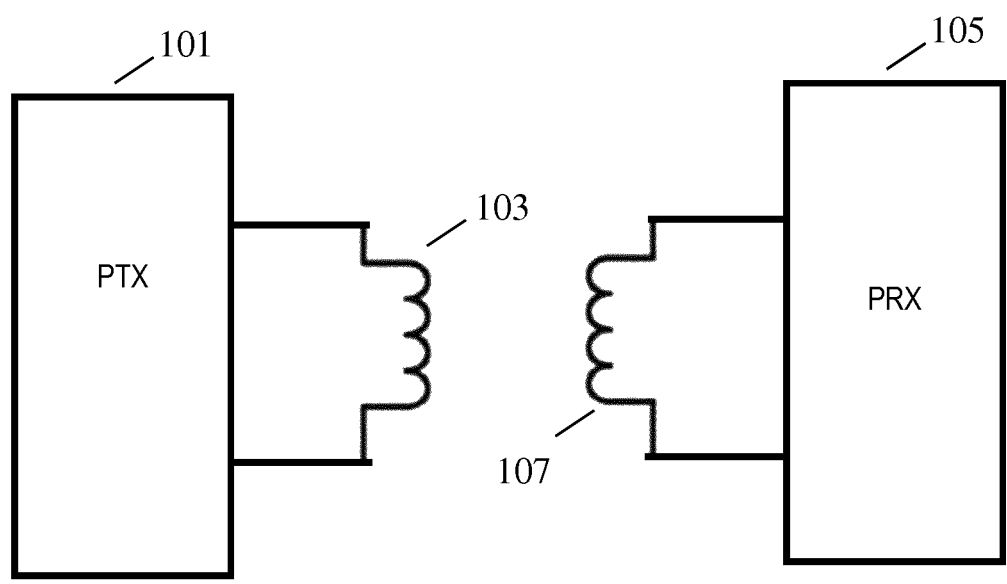
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may correspond to the electromagnetic power transfer component representing the energy transfer from the power transmitter to the power receiver, and may be considered to correspond to the component of the generated electromagnetic field that transfers power from the power transmitter to the power receiver. For example, if there is no loading of the receiver coil 107, no power will be extracted by the power receiver from the generated electromagnetic field (apart from losses). In such a scenario, the driving of the transmitter coil 103 may generate an electromagnetic field of potentially high field strength but the power level of the power transfer signal will be zero (apart from losses). In some situations, where a foreign object is present, the power transfer signal may be considered to include a component corresponding to the power transfer to the foreign object, and thus the power transfer signal may be considered to correspond to the power being extracted from the electromagnetic field generated by the power transmitter.

The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 1000 W for very high-power applications, such as e.g. kitchen applications.

In the following, the operation of the power transmitter 101 and the power receiver 105 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

In order to have optimal performance in a wireless power transfer system such as that of FIG. 1, it is desirable for the power transfer coils 103, 107 of the power transmitter 101 and the power receiver 105 to be closely aligned such that they share the maximum amount of magnetic flux. It is therefore desirable for the coils 103, 107 to be geometrically aligned in order to maximize the coupling factor (K) between the transmitter and receiver coils. In practical applications, the alignment between the power transmitter and the power receiver is variable and therefore a perfect or even known alignment is not possible. However, as will be described in the following, the system of FIG. 1 comprises functionality for estimating the displacement between the transmitter coil 103 and the receiver coil 107, and specifically to estimate the position of the receiver coil 107 relative to the transmitter coil 103. Knowing this displacement may be used in many different ways to provide improved performance. For example, it may be used to determine suitable parameters for the power transfer (e.g. maximum power level), provide user feedback, compensate detection operations including e.g. detection of load communication or of the presence of metallic objects etc.

The estimation of the displacement/alignment/relative position is based on comparing a plurality of test parameter values to corresponding calibration or reference parameter values for a typically relatively large number of possible displacements of a power receiver. In the approach, the power transmitter 101 is arranged to perform tests to generate the plurality of test parameters and then compare this to calibration data retrieved for the receiver with the calibration data comprising calibration values for different misalignments/displacements.

Figure 2:
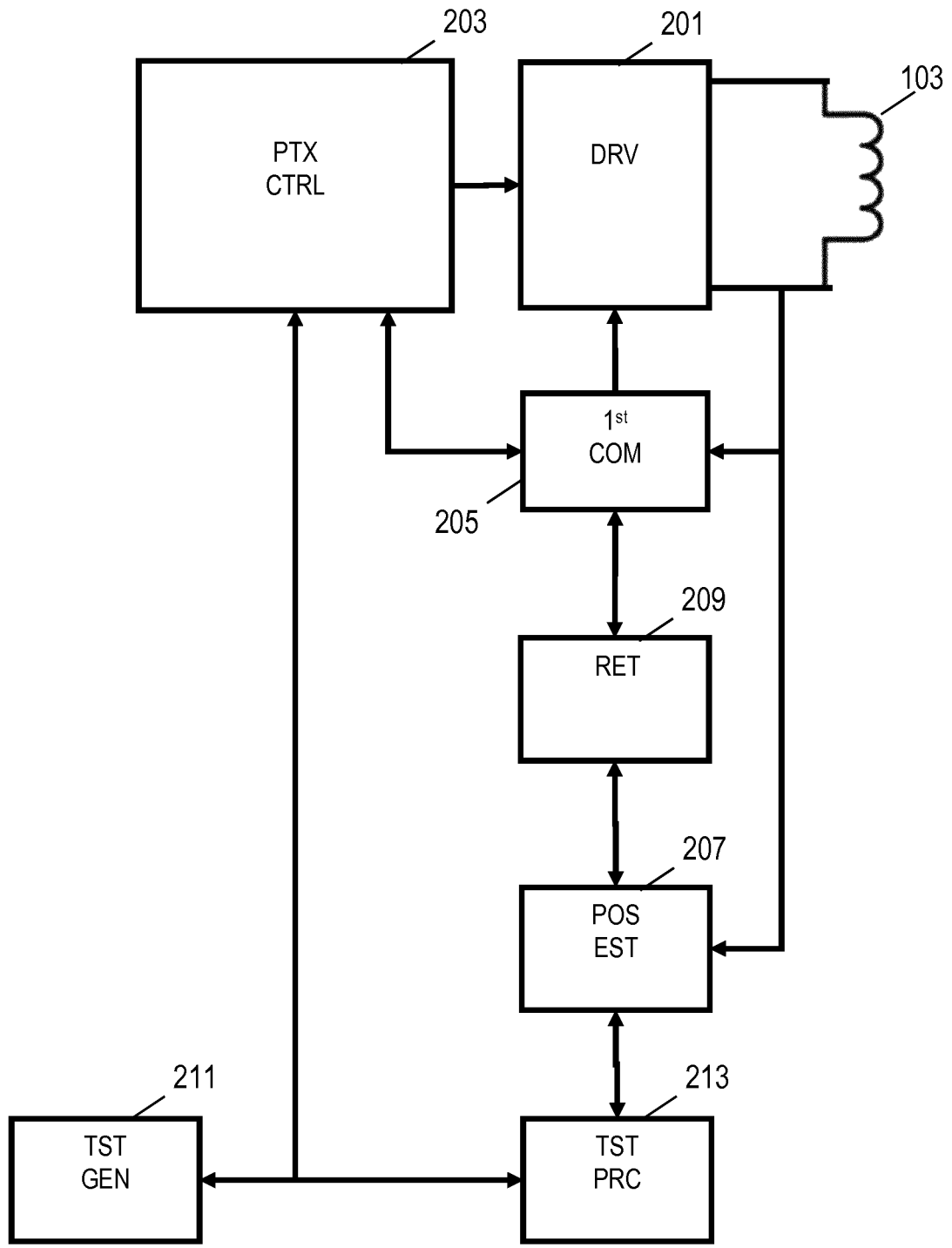
FIG. 2 illustrates an example of elements of a power transmitter in accordance with some embodiments of the invention.
Figure 3:
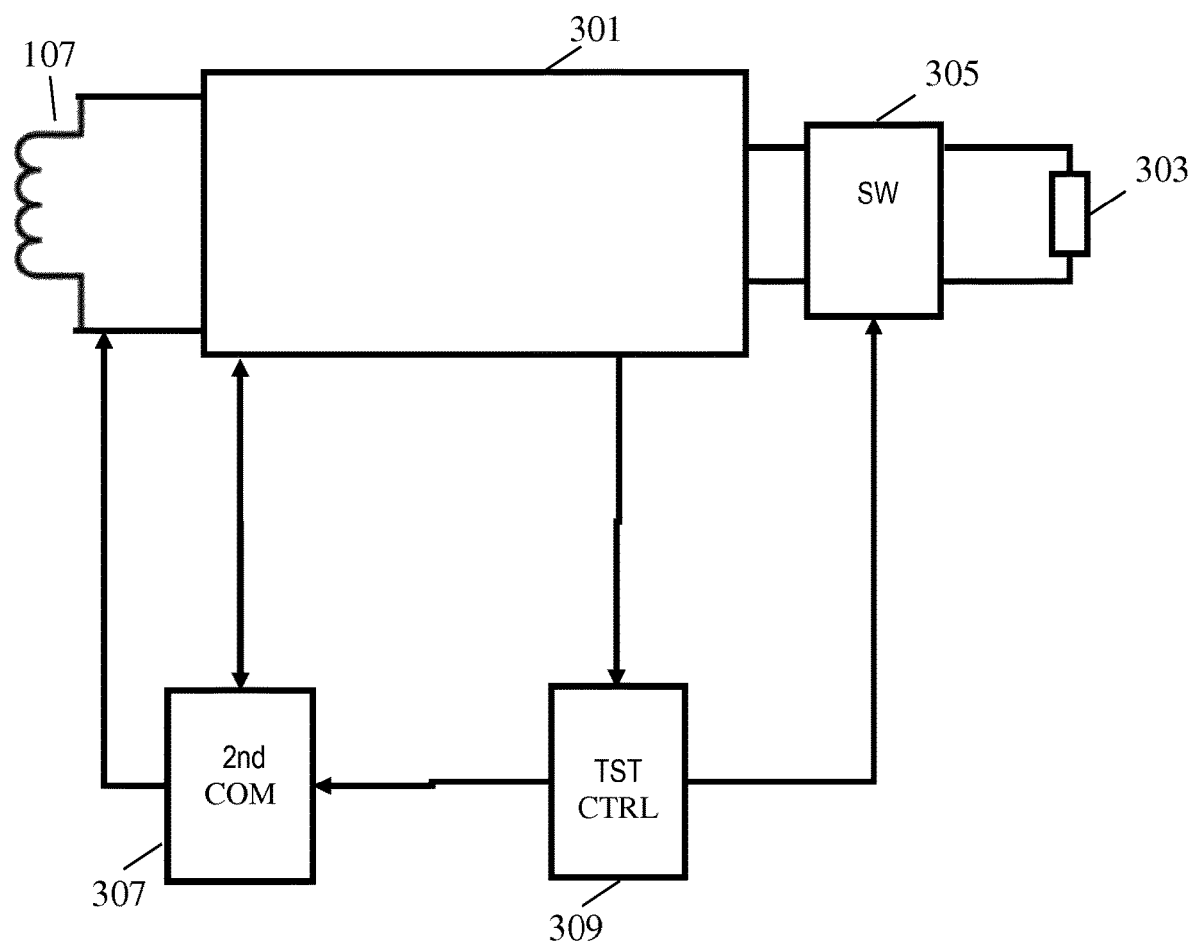
FIG. 3 illustrates an example of elements of a power receiver in accordance with some embodiments of the invention.

FIG. 2 illustrates elements of the power transmitter 101 and FIG. 3 illustrates elements of the power receiver 105 of FIG. 1 in more detail.

The power transmitter 101 includes a driver 201 which can generate a drive signal that is fed to the transmitter coil 103 which in return generates an electromagnetic field and thus the electromagnetic power transfer signal which provides power transfer to the power receiver 105. The power transfer signal is provided (at least) during a power transfer phase.

Figure 4:
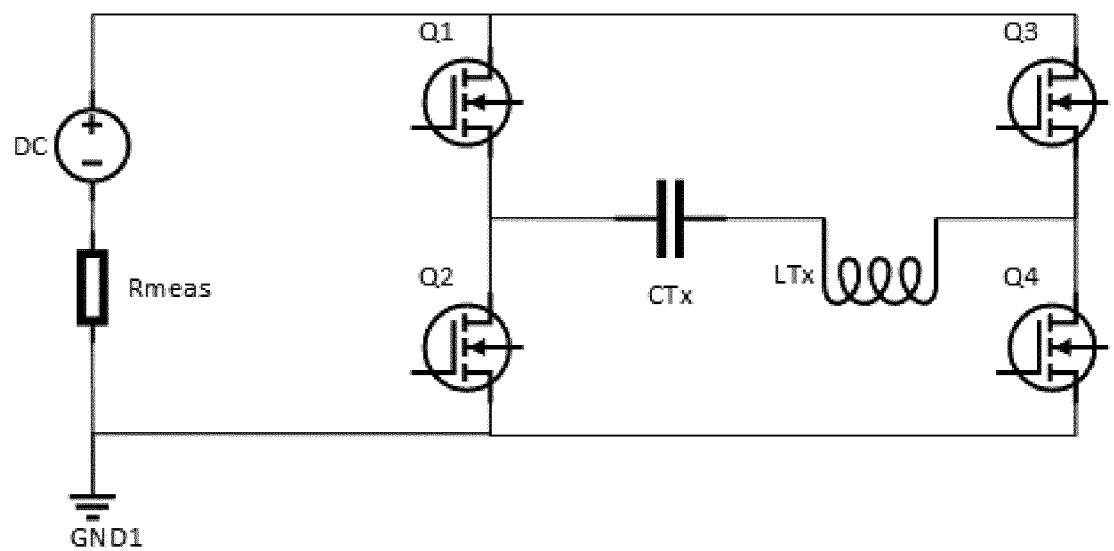
FIG. 4 illustrates an example of elements of an output stage of a power transmitter.

The driver 201 may typically comprise an output circuit in the form of an inverter, typically formed by driving a full or half bridge as will be well known to the skilled person. FIG. 4 illustrates an example of a typical output stage of a power transmitter where an inverter is formed by four FETs coupled in a bridge configuration and with the transmitter coil 103 (LTx) further being coupled to a capacitor (CTx) to form a resonant output circuit. The power transmitter 101 further comprises a power transmitter controller 203 which is arranged to control the operation of the power transmitter 101 in accordance with the desired operating principles. Specifically, the power transmitter 101 may include many of the functionalities required to perform power control in accordance with the Qi Specifications.

The power transmitter controller 203 is in particular arranged to control the generation of the drive signal by the driver 201, and it can specifically control the power level of the drive signal, and accordingly the level of the generated power transfer signal/electromagnetic field. The power transmitter controller 203 comprises a power loop controller controlling a power level of the power transfer signal in response to power control messages received from the power receiver 105 during the power control phase.

In order to receive data and messages from the power receiver 105, the power transmitter 101 comprises a first communicator 205 which is arranged to receive data and messages from the power receiver 105 (as will be appreciated by the skilled person, a data message may provide one or more bits of information). In the example, the power receiver 105 is arranged to load modulate the power transfer signal generated by the transmitter coil 103, and the first communicator 205 is arranged to sense variations in the voltage and/or current of the transmitter coil 103 and to demodulate the load modulation based on these. The skilled person will be aware of the principles of load modulation, as e.g. used in Qi wireless power transfer systems, and therefore these will not be described in further detail.

In many embodiments, the first communicator 205 is further arranged to transmit data to the power receiver 105 and may specifically be arranged to modulate the power transfer signal using frequency, amplitude, or phase modulation.

In some embodiments, communication may be performed using a separate communication channel which may be achieved using a separate communication coil, or indeed using the transmitter coil 103. For example, in some embodiments Near Field Communication may be implemented or a high frequency carrier (e.g. with a carrier frequency of 13.56 MHz) may be overlaid on the power transfer signal.

The power transmitter 101 further comprises a position estimator 207 which is arranged to estimate a position of the power receiver relative to the power transmitter, i.e. it may specifically estimate the misalignment between the power transmitter 101 and the power receiver 105. In many embodiments, the position estimator may specifically estimate the position of the receiver coil 107 relative to the transmitter coil 103 (which may be considered to be equivalent to determining the relative position of the power receiver with respect to the power transmitter). The position of the power receiver/receiver coil relative to the power transmitter/transmitter coil will in the following be referred to as the relative position or the (mis)alignment of the power receiver.

Figure 5:
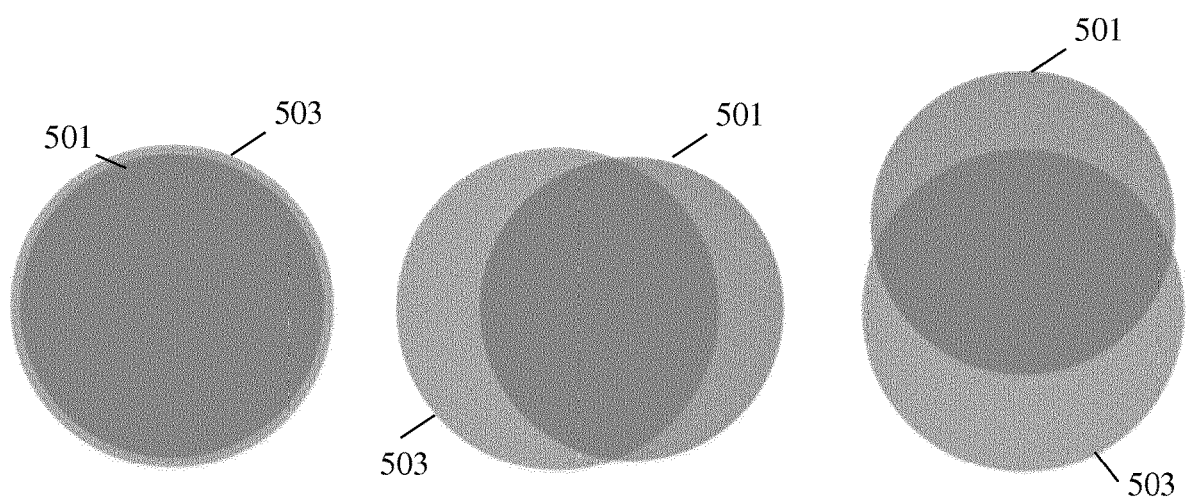
FIG. 5 illustrates some examples of alignments between a transmitter coil and a receiver coil.
Figure 6:
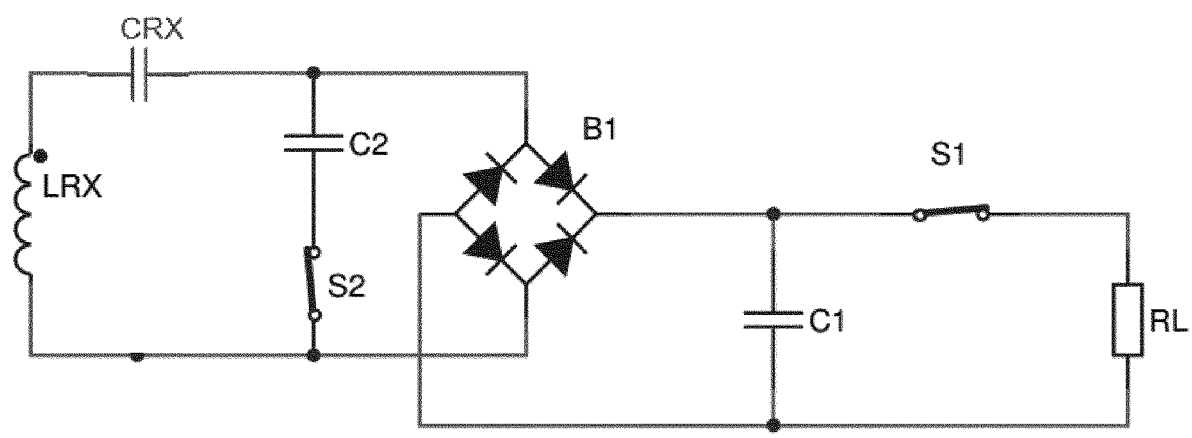
FIG. 6 illustrates an example of elements of a power receiver in accordance with some embodiments of the invention.

In some embodiments, the relative position of the power receiver may be determined as a three-dimensional relative position. However, in most practical applications, the freedom of positioning the power receiver is substantially limited to two dimensions. This may typically be the case where the power receiver device is placed on a power transmitter device for powering, as the power transmitter device in such cases typically have a horizontal surface on which a surface of the power receiver device is placed thereby resulting in a typically the same vertical displacement but with different horizontal displacements/misalignments. As an example, FIG. 5 illustrates scenarios for the alignment of a receiver coil outline 503 relative to a transmitter coil outline 501 for respectively a perfect alignment, a misalignment in the x axis, and a misalignment in Y axis. The misalignment will typically be dynamic and depend on how the user places the power receiver on the power transmitter. Every time a user places the power receiver device, there is no guarantee that they are completely aligned. A large misalignment causes poor coupling leading to longer charging time, wastage of power, heating of friendly metal in the power receiver, and other inconveniences to the user.

In many embodiments, the position estimator 207 is arranged to estimate this horizontal misalignment, and it may specifically detect not just a distance or magnitude of any misalignment but also the direction of the misalignment. Thus, in many embodiments, the position estimator 207 is arranged to estimate a two-dimensional relative position of the power receiver.

The position estimation is based on comparing measured test parameters to retrieved calibration data which comprises calibration parameters corresponding to the test parameters. The calibration parameters are provided for a range of different relative positions, and typically for a range of different three dimensional positions (even for the estimated position being two-dimensional as will be described later). The calibration data is typically generated during the manufacturing and/or design phase, and may e.g. be provided for a reference receiver and reference transmitter from a central store comprising calibration data for many different power transmitter and power receiver combinations.

The calibration and test parameters comprise at least a power loss measure, resonance frequency measure, and a coupling measure. The position estimation accordingly includes a multivariate comparison between test parameter values and calibration parameter values for a range of different position offsets. Further, the parameters provide a particularly advantageous selection for providing good indications of different relative positions. The different parameters tend to have different dependencies on different misalignments and they accordingly combine synergistically to provide additional information indicative of the misalignment.

The position estimator 207 is coupled to a retriever 209 which is arranged to retrieve the calibration data from an external or internal source. The retriever thus retrieves data which provides sets of calibration parameters for each of a plurality of spatial positions of a calibration receiver relative to a calibration transmitter. For example, the calibration data may be stored in a local store and extracted and fed to the position estimator 207.

The power transmitter 101 further comprises a test generator 211 which is arranged to generate test drive signals for the transmitter coil 103 which results in this generating a test electromagnetic signal. In the example, the test generator 211 is coupled to the power transmitter controller 203 and is arranged to control this to control the driver 201 to generate the electromagnetic test signal. In other embodiments, the test generator 211 may for example directly control the driver 201 or may e.g. in itself comprise a driver for generating the drive signal which may then be fed to the transmitter coil 103.

The power transmitter 101 further comprises a test processor 213 for determining a set of test parameter values in response to the test drive signal. The test processor 213 may specifically measure or determine the impact of the power receiver on the generated electromagnetic test signal. The impact may be measured directly or indirectly. For example, the power level of the drive signal, a frequency variation, a response to a frequency sweep, etc may be determined and test parameters may be generated from these values. In some situations, information from the power receiver may further be used to provide data allowing the test parameters to be determined. The test processor 213 in particular generates a test power loss measure, a test resonance frequency measure, and a test coupling measure.

The resulting test parameters are then fed to the position estimator 207 where they are used to estimate the relative position of the power receiver by comparing them to corresponding parameter values in the calibration data.

FIG. 3 illustrates some exemplary elements of the power receiver 105.

The receiver coil 107 is coupled to a power receiver controller 301 which couples the receiver coil 107 to a load 303 via a switch 305 (i.e. it is a switchable load 305). The power receiver controller 301 includes a power control path which converts the power extracted by the receiver coil 107 into a suitable supply for the load. In addition, the power receiver controller 301 may include various power receiver controller functionality required to perform power transfer, and in particular functions required to perform power transfer in accordance with the Qi specifications.

In order to support communication from the power receiver 105 to the power transmitter 101 the power receiver 105 comprises a second communicator 307.

The second communicator 307 is arranged to transmit data to the power transmitter by varying the loading of the receiver coil 107 in response to data to be transmitted to the power transmitter 101. The load variations are then detected and demodulated by the power transmitter 101 as will be known to the person skilled in the art.

In the example, the second communicator 307 is furthermore arranged to demodulate amplitude, frequency, and/or phase modulation of the power transfer signal in order to retrieve data transmitted from the power transmitter.

FIG. 5 illustrates a circuit diagram of elements of an example of a power path of the power receiver 105. In the example, the power receiver 105 comprises the receiver coil 107 referred to by the designation LRX. In the example, receiver coil 107 is part of a resonance circuit and the power receiver 105 accordingly also includes a resonance capacitor CRX. The receiver coil 107 is subjected to the electromagnetic signal/field and accordingly an AC voltage/current is induced in the coil. The resonance circuit is coupled to a rectifier bridge with a smoothing capacitor C1 coupled to the output of the bridge. Thus, a DC voltage is generated over the capacitor C1. The magnitude of the ripple on the DC voltage will depend on the size of the smoothing capacitor as well as on the load.

The bridge B1 and smoothing capacitor C1 are coupled to the load 303 which is indicated by reference sign RL via the switch 305 which is illustrated by switch S1. The switch 305 can accordingly be used to connect or disconnect the load from the power path and thus the load is a switchable load 305. It will be appreciated that whereas the switch S1 is shown as a conventional switch, it may of course be implemented by any suitable means including typically by a MOSFET. It will also be appreciated that the load 303 is illustrated as a simple passive port but that it may of course be any suitable load. For example, the load 303 may be a battery to be charged, a mobile phone, or another communication or computational device, may be a simple passive load etc. Indeed, the load 303 need not be an external or dedicated internal load but may for example include elements of the power receiver 105 itself. Thus, the load 303 illustrated in FIGS. 3 and 5 may be considered to represent any load of the receiver coil 107/the electromagnetic signal that can be disconnected by the switch 305/S1, and it is accordingly also referred to as a switchable load 305.

The power receiver 105 further comprises a test controller 309 which is arranged to support the power transmitter when performing position estimation. The test controller 309 is coupled to the second communicator 307 and is arranged to provide information to this for communication to the power transmitter 101. For example, the test controller 309 may control the second communicator 307 to transmit information identifying the power receiver itself (e.g. providing a device identification or a device type identification). The test controller 309 may further be arranged to control the switch 305 such that the switchable load 305 may be disconnected during times at which the test generator 211 generates the test signals.

The position estimation is based on a multivariate analysis considering at least three different parameters. The position estimator 207 is arranged to determine the position based on comparing calibration and test values for at least power loss measure, a resonance frequency measure; and a coupling measure.

The power loss measure will be referred to as $PM^{pl}_{x,y,z}$. and may be a value indicative of the power being extracted from the electromagnetic signal generated by the transmitter coil 103 by the power receiver 105. Power loss measure may specifically reflect the resistive power dissipated in the transmitter and in the friendly metal of the receiver which is exposed to the magnetic field of the transmitter.

The power loss measure may in many embodiments be determined for a predetermined and fixed load of the power receiver, and may specifically be determined for the load 303 of the power receiver being disconnected (and for the loading of the power receiver on the power transfer signal being minimized). The power loss measure may accordingly in many embodiments reflect the amount of magnetic flux from the transmitter coil 103 that is exposed to the friendly metal in the receiver and the environment. As this will depend on the relative position of the power receiver with respect to the power transmitter, the power loss measure will provide useful information on the position of the power receiver. Further, a non-uniform distribution of the friendly metal in the power receiver provides variation in the power loss measure $PM^{pl}_{x,y,z}$ for the same coil misalignment distance and hence provides additional information, such as on the direction of misalignment.

The power loss measure may for example be determined in response to a measurement of a value reflecting the power loss of the electromagnetic test signal when this is being generated. For example, the power of the test drive signal during a test scenario in which the power receiver has disconnected its load may be measured and used as a power loss measure.

In other embodiments, a more indirect measure may be used as the power loss measure. For example, in most embodiments, the transmitter coil 103 is part of an output resonance circuit and the power loss from the electromagnetic signal will tend to have an effect corresponding to a resistive load of that resonance circuit. Thus, the damping of the resonance circuit will increase for an increasing power loss, and the power loss measure may in some embodiments be generated as measure reflecting such a damping. For example, the power loss measure may be generated as a Q-factor value or similar.

The resonance frequency measure will also be denoted as $PM^{rf}_{x,y,z}$ and may be indicative of a resonance frequency of an (output) resonance circuit comprising the transmitter coil 103. As is well known in the art of wireless power transfers, a transmit coil is often coupled with at least one capacitor to form a(n output) resonance circuit. Similarly, a receiver coil is often coupled with at least one capacitor to form a(n input) resonance circuit. The use of such resonance circuits have been found to provide substantially improved power transfer in most practical scenarios.

In the absence of any power receiver (or other conductive elements), the output resonance circuit will have a given resonance frequency typically only determined by the capacitance and inductance of the components of the output resonance circuit. However, in the presence of a power receiver, the induced currents in the power receiver will result in a change in the resonance frequency of the output resonance circuit. Further, the effect will depend on the level of the impact of the power receiver, and thus on the relative position of this. The resonance frequency measure reflecting the resonance frequency may accordingly provide information that is indicative of the relative position of the power receiver. The resonance frequency measure may for example be measured by the test generator 211 generating a frequency sweep signal and the test processor 213 measuring the response of the output resonance circuit and identifying the maxima e.g. for the current drawn.

The coupling factor measure will also be denoted as $PM^{\kappa}_{x,y,z}$ and is indicative of the coupling between the power transmitter and the power receiver (and thus the transmitter coil 103 and the receiver coil 107). The coupling factor measure will thus be indicative of the electromagnetic coupling between the coils and will reflect the amount of flux passing through both coils. The coupling factor measure will accordingly be dependent on the relative position of the power receiver and thus will provide information on this.

The determination of the coupling factor measure may be different in different embodiments. For example, in some embodiments, the test generator 211 may generate a test drive signal resulting in the electromagnetic test signal. The power receiver may then measure the induced voltage and transmit this measured value back to the power transmitter which may determine the coupling factor measure as a function of this (it could even directly use the reported induced voltage as the coupling factor measure).

As another example, the test generator 211 may gradually increase the level of the test drive signal until the power receiver detects that the induced voltage reaches a given threshold. It may then transmit a message to the power transmitter indicating that this has occurred and the test processor 213 may then determine the coupling factor measure in response to the level of the test drive signal when this occurs (or indeed use the level directly as a coupling factor measure).

As another example, the coupling may be measured by the transmitter applying a known voltage to the transmitter coil and the power receiver reporting the voltage induced in the receive coil. The ratio of the two provides a coupling measure. The coupling measure may accordingly be determined by the ratio of voltage on the receive coil 107 and the voltage of the transmitter coil 103.

The three specific parameters provide a particular efficient and advantageous set of parameters that may significantly improve position estimation in many practical scenarios and applications. They provide particularly efficient synergy in information. In particular, the different parameters may have different dependencies on the relative position/misalignment leading to the combination of the parameters, and the joint consideration of these, resulting in a more accurate position estimation in many applications. For example, the coupling factor measure will tend to have a substantially linear relationship to increasing misalignment whereas the power loss measure will tend to have a substantially quadratic relationship. The different measures provide different relationships and the interrelationship between them accordingly provides additional information. Also, the different relationships and dependencies may result in different measures providing particularly useful information for different magnitudes of the displacement thereby allowing more accurate position estimation over a larger range.

Although the three parameters described above provide a particularly efficient and high performance position estimation in many situations, it will be appreciated that the approach is not limited to only using these parameters but that additional parameters may be considered in many embodiments.

The calibration data may comprise a set of calibration parameters for each of a plurality of spatial positions of a calibration receiver relative to a calibration transmitter, where each set comprises at least one calibration power loss measure, one calibration resonance frequency measure, and one calibration coupling measure. For example, the calibration data may comprise of a three dimensional array with each dimension corresponding to a spatial dimension (x, y and z) and with array elements being a set of calibration parameters for an alignment between transmitter coil and a receiver coil corresponding to the set of spatial dimensions. Each set of calibration parameters may thus comprise measures corresponding to those generated during a test operation by the power transmitter.

The calibration data may typically be predetermined calibration data and may be generated e.g. during a manufacturing or design phase. Specifically, during the design (including prototyping) or the manufacturing phase, the manufacturer may perform measurements with a power transmitter using a number of predetermined or defined test signals and with a power receiver positioned at a potentially large number of relative positions. For each position, and each test signal, the resulting parameters may be measured using the same approach as will be used by the power transmitter in the field. The resulting measures may be stored as sets of calibration parameters. For example, as previously mentioned, a three dimensional array may be generated with the relative position coordinates forming the three dimensions and the determined parameter values for the corresponding positions being stored at as the array element.

The resulting calibration may for example then be stored in the power transmitter (e.g. the retriever 209 may comprise a store for storing the calibration data). However, in many embodiments, the data may be stored centrally for later retrieval by the power transmitter as will be described in more detail later.

Different approaches will in different embodiments be used by the position estimator 207 to estimate the relative position. In some embodiments, a simple comparison may be used wherein the position estimator 207 evaluates a cost function for all positions for which the calibration data comprises a parameter set. The cost function may be indicative of the difference between the test parameters determined by the test processor 213 and the calibration test parameters for the specific position. For example, a cost function may be used which is monotonically increasing for each difference between a test parameter measure and the corresponding calibration parameter measure. The position estimator 207 may determine a cost value for each position using the cost function. The estimated relative position may then be determined as the position for the set of parameters that results in the lowest cost value.

In other embodiments, more complex procedures may be used. For example, in some embodiments a machine learning approach may be used to find a matching parameter set and an associated position. Such a machine learning approach may e.g. be based on a learning process performed during the design or manufacturing phase.

A machine learning algorithm using supervised learning comprises of building a training set, in the example corresponding to the described calibration data. In supervised learning, the learning algorithm is fed with various measured test parameters such as power loss, coupling factor and resonance frequency and the corresponding x,y misalignment values are used as outputs. Once the training is finished we have a set of measured parameters and a corresponding set of outputs in the form of x, y and z values for each output parameter, a polynomial curve fitting is performed such as $$y1 = a11*X1 + a12*X1*X1 + \ldots + a21*X2 + q22*X2*X2 + \ldots a31*X3 + a32*X3*X3 \ldots$$

where y1=x misalignment, aij=fitting coefficients and Xi=feature such as powerloss.

Based on this fitted curve in the calibration phase, during infield operation the feature value X1=powerloss, X2=coupling factor and X3=resonance frequency is measured.

Using the above curve fitted equations for y1(x displacement) and y2(y displacement) the measured feature values are fed to the equation to retrieve the misalignment information.

As mentioned previously, the array may reflect three spatial dimensions and indeed the relative position may in many embodiments be determined as a three dimensional relative position. However, in many practical applications, the positioning freedom of the power receiver is substantially limited to two dimensions.

The distance between the transmitter coil 103 and the receiver coil 107 may thus in many embodiments be comprised of a distance in one direction that the user has little control over and impact on, and of a distance in a two-dimensional plane in which the user has some freedom in the positioning. The former will be referred to as the separation distance between the transmitter coil 103 and the receiver coil 107 and the second will in the following be referred to as the misalignment of the transmitter coil 103 and the receiver coil 107. The direction over which the user has little freedom (i.e. the direction of the separation distance) will typically be perpendicular to the contact surface for receiving the power receiver. Further, this direction will typically be perpendicular to the plane of the transmitter coil 103 and indeed to the plane of the receiver coil 107 as arranging the coils to be parallel to the contact surfaces tend to result in the highest coupling factor.

Figure 7:
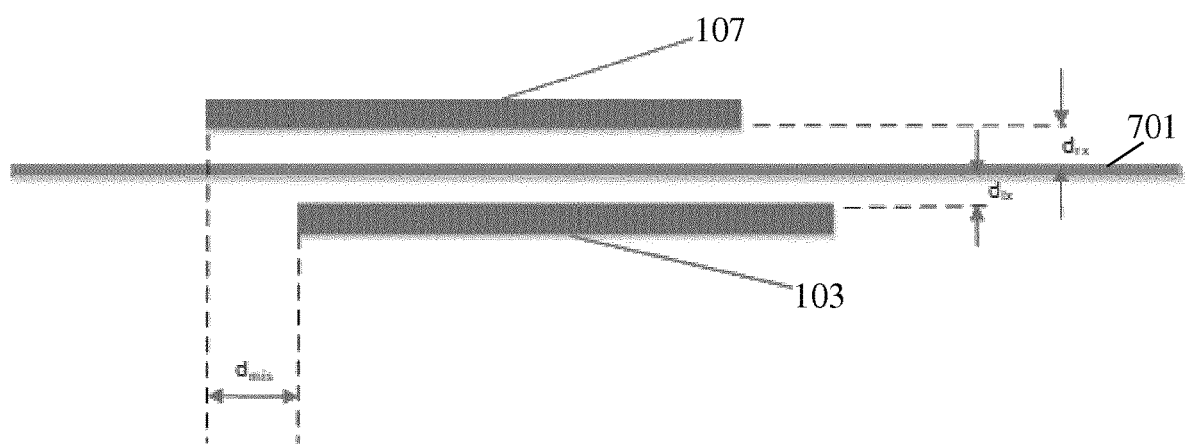
FIG. 7 illustrates some examples of alignments between a transmitter coil and a receiver coil.

The situation may be illustrated by FIG. 7 which shows an example of a cross section of an arrangement of the power transmitter and the power receiver. The power receiver is positioned with a lower surface resting on an upper surface of the power transmitter. The interface 701 between the two surfaces is shown in FIG. 7. The transmitter coil 103 and the receiver coil 107 will typically be comprised within the device and accordingly will be offset with respect to the outer surface and thus the will be at a distance from the interface 701. In the example, $d_{tx}$ indicates the distance between the interface surface 701 and the transmitter coil 103. $d_{rx}$ is the distance between the interface surface 701 and the receiver coil 107. The total separation distance between the receiver coil 107 and the transmitter coil 103 is $d_{tx\text{-}rx} = d_{rx} + d_{tx} +$ any interface surface thickness. We denote this as the 'z' parameter.

The separation distance between the transmitter coil 103 and the receiver coil 107 may in many cases be predictable. For example, the distance between a coil and the corresponding contact or interface surface will be known for the specific device. In practice, it is possible that these distances may vary a bit (e.g. a phone cover on a smartphone may increase the $d_{rx}$ value, and hence the $d_{tx\text{-}rx}$ values, by a small amount). This may however typically only introduce small and acceptable inaccuracies.

The total separation distance may impact the coupling factor. This value may further be affected by the misalignment between the transmitter coil 103 and the receiver coil 107 and is denoted by the term $d_{mis}$. $d_{mis}$ is represented by the 'x' and 'y' parameters, i.e. by values in the plane of the contact surface.

It is desirable to minimize both $d_{tx\text{-}tx}$ and $d_{mis}$ to achieve a high coupling factor. Alternatively or additionally, it is desirable to compensate for these values. Whereas $d_{tx\text{-}rx}$ tends to be fixed (by construction), $d_{mis}$ varies depending on the user and usage. E.g. for laptop and mobile eco system, free placement of the power receiver device is important for consumer convenience. In such scenarios, a user might place the receiver coil with a large miss-alignment distance $d_{mis}$ such that coupling factor might become lower than a required threshold value leading to very inefficient power transfer or so that it substantially affects some operations of the power transfer system (e.g. communication).

In many embodiments, the position estimator 207 may be arranged to determine the separation distance, i.e. it may determine a perpendicular distance measure which is indicative of a distance between the transmitter coil 103 and the receiver coil 107 in a direction perpendicular to the contact surface for receiving the power receiver the transmitter coil 103.

In a typical embodiment, the power transmitter 101 has locally stored data reflecting the distance $d_{tx}$ from the transmitter coil 103 to the contact surface. The distance is typically dependent only on the physical design of the power transmitter device and accordingly will be known at the design phase and can be stored in the power transmitter device during the manufacturing phase.

The distance $d_{tx}$ from the contact surface of the receiver to the receiver coil 107 may in some embodiments be known by the power transmitter or can be estimated or replaced by a typical or nominal value. For example, if the power transmitter is intended only for use with a specific power receiver, the power receiver separation distance may be known.

However, in most embodiments, the power receiver separation distance will not be known by the power transmitter. In many such embodiments, however, the power transmitter may be arranged to receive a message from the power receiver which comprises a power receiver distance indicator which is indicative of the distance from the receiver coil to an external surface of the power receiver. For example, the power receiver may have stored the local value for the power receiver separation distance $d_{rx}$ and during the initialization phase when the power receiver is first detected, the power receiver may transmit information to the power transmitter about $d_{rx}$.

The position estimator 207 may then proceed to determine the total separation distance between the receiver coil 107 and the transmitter coil 103 as $d_{tx\text{-}rx}=d_{rx}+d_{tx}$ (in the example, it is assumed that the contact surfaces are in immediate contact, so no interface distance needs to be considered).

The position estimator 207 may then proceed to determine the position of the power receiver in response to a comparison of this separation distance/perpendicular distance measure, $d_{tx\text{-}rx}$, to the spatial positions of a calibration receiver in the calibration data.

For example, in some embodiments, the cost function may be generated to also consider the difference between the determined separation distance and the corresponding distance for the array entry. Specifically, the more the z-value of the position for a given set of calibration parameters differs from the determined separation distance, the higher the cost function (i.e. the cost function is a monotonically increasing function of the difference between the separation distance and the distance reflected by the z-value).

In some embodiments, the position estimator 207 may simply ignore all calibration parameter sets that correspond to a z-direction distance that differs by more than a given threshold from the separation distance. Thus, in some embodiments, the position estimator 207 may be arranged to select a subset of the stored calibration parameter sets for which the spatial position meets a criterion with respect to the determined separation distance, and to estimate the relative position based on only this subset.

The consideration of the separation distance as an "input" (constraining parameter) to the position estimation rather than a result thereof may in many scenarios provide a more accurate position estimation.

The description above has focused on examples wherein the calibration data comprises only data for the specific power receiver. However, in many embodiments, the power transmitter will be designed to operate with many different types of power receiver having significantly different characteristics. In some systems, the differences may be sufficiently small to still allow a reasonable position estimation based on average or nominal calibration data.

However, in many embodiments, calibration data will be generated for a plurality of power receiver and specifically may be produced for a plurality of different types of power receivers. In such embodiments, the power receiver may transmit a message to the power transmitter which comprises a power receiver identification indication, and the retriever 209 may be arranged to retrieve calibration data matching the power receiver identification indication and to use this for the position estimation.

In many embodiments, the power receiver identification indication may comprise an identification of the individual device, and it may uniquely identify the power receiver device. This may for example be the case if the user is arranged to perform a process to generate calibration data, e.g. by being instructed to position the power receiver at different misalignments and proceed to perform a test. The resulting data may be stored locally in the power transmitter and may be retrieved whenever that specific power receiver is positioned for being powered.

In many embodiments, the power receiver identification indication may be a type identification of the power receiver. Thus, the device may not be uniquely identified but rather the retriever 209 will be arranged to retrieve calibration data for the specific type of power receiver. This will allow the calibration data to be reused for many different devices of the type and will typically avoid the necessity for a user to perform a calibration process. For example, when putting a new power receiver device on the market (e.g. a new smartphone), the manufacturer may perform calibration tests to generate calibration data. The results may be stored in a suitable form and provided to the power transmitters via a suitable distribution approach.

In some embodiments, a combination of device specific and type specific data may be used. For example, the user may perform a calibration process for one or more of his personal devices often being used with the power transmitter. The resulting calibration data may be stored locally and used whenever the power transmitter is used with one of these devices. However, if the power transmitter is used with a different power receiver device, type specific calibration data may instead be retrieved and used in the position estimation. The retriever 209 may be arranged to retrieve the calibration data from different sources in different embodiments.

In some embodiments, the retriever 209 may comprise a local store which stores the calibration data and the retriever 209 may be arranged to retrieve the appropriate data therefrom. Such an approach may be suitable for embodiments in which the user generates the calibration data or where the power transmitter can assume that the power receiver is limited to typically a very small number of devices with known characteristics.

However, in many systems, the power transmitter is required to be able to interwork with a large number of different devices of different types and with different characteristics. Indeed, in many systems, the range of potential power receiver devices that need to be supported may not be known as it is required that the power transmitter also interwork with future devices.

In some embodiments, one or more central sources may accordingly comprise calibration data for a plurality of power receivers. For example, a standards (or other responsible) body may operate a central deposit to which manufacturers of power receivers provide calibration data whenever they put a new device on the market.

In some embodiments, the retriever 209 may be arranged to retrieve the calibration data from a remote server, such as a central server operated by a third party. The retriever 209 may for example in response to receiving a power receiver identification indication from a power receiver generate a calibration data request message that includes an identification indication corresponding to the power receiver identification indication. In many embodiments, the power receiver identification indication may for example simply be a power receiver type identification and this may directly be used in the calibration data request message. However, in other embodiments, the indication may be modified, for example a device specific power receiver identification indication may be converted to a type specific identification.

The power transmitter may in this way be arranged to retrieve calibration data for any (authorized) power receiver and may further be arranged to retrieve up-to-date and specific calibration data for the exact power receiver that is currently being supported. The retriever 209 may for example comprise an interface for coupling the power transmitter to the Internet and it may connect to the central server via the Internet.

In some embodiments, the power transmitter may be arranged to receive the calibration data from the power receiver. For example, during manufacturing of the power receiver, the manufacturer may perform a calibration process and store the resulting calibration data in a local memory of the power receiver. When initializing power transfer with a power transmitter, the power receiver may transmit the calibration data to the power transmitter which may then proceed to use this for the position estimation.

In some embodiments, the power receiver may not itself store the relevant calibration data but may instead be arranged to contact a central server to retrieve the appropriate data. The power receiver may then transmit this to the power transmitter. Such an approach may be practical in many applications as power receiver devices tend to be relatively complex and have communication functionality (e.g. smartphones) whereas power transmitters tend to have relatively low complexity and may not have communication functionality.

The above description has focused on scenarios in which the calibration data is provided for the specific power transmitter. This is for example suitable for embodiments in which the calibration data is stored locally in the power transmitter. However, in embodiments where the calibration data is retrieved from e.g. a remote source or the power receiver, calibration data may be available for a range of power transmitters in order to support a plurality of different power transmitters. In such embodiments, the power transmitter may not only retrieve calibration data for the specific power receiver but rather for the specific power transmitter/power receiver combination. In many embodiments, the retrieval of the calibration data may accordingly also include an identification of a power transmitter. For example, the calibration data request message may in addition to an identification of the power receiver also include an identification of the power transmitter.

In many embodiments, the calibration data may be provided for a reference transmitter rather than for the specific transmitter. For example, calibration data may during the manufacturing phase for a power receiver be determined for a nominal reference transmitter. The resulting data may then be stored, e.g. in the central server or the power receiver itself.

In such embodiments, the power transmitter may accordingly receive calibration data which is not specific to the individual power transmitter but rather relates to the reference transmitter. However, in case the power transmitter has properties that are sufficiently close to the reference power transmitter, these may be used directly.

In other embodiments, the position estimator may be arranged to modify the calibration data to reflect a difference between the reference power transmitter and the actual power transmitter. Thus, one or more of the calibration parameters (or equivalently one or more of the test parameters) may be modified to reflect the difference between a property of the power transmitter and a property of the reference power transmitter.

For example, if it is known that the reference power transmitter has a given physical design with a certain distance from the transmitter coil to the contact surface which is substantially larger than the corresponding distance from the transmitter coil to the contact surface for the power transmitter 101, then the calibration data for the reference transmitter may be modified by e.g. increasing the recorded coupling factor by a given proportion.

As another example, if it is known that the reference power transmitter includes a given amount of friendly metal resulting in some power loss in this friendly metal itself, then the power loss calibration parameters may be adapted based on a known difference in friendly metal for the current power transmitter.

In many embodiments, the test generator 211 may be arranged to generate a plurality of different test signals and test parameters may be generated for the different signals. Similarly, the calibration data may comprise a plurality of calibration parameters for different test signals for each spatial position.

In some embodiments, the same test parameter/calibration parameter may be determined for different test signals. For example, the coupling factor may be generated for low signal level and a high signal level or for different frequencies.

The position estimator 207 may accordingly consider a plurality of power loss measures, a plurality of resonance frequency measures, and/or a plurality of coupling measures for each position and test.

Figure 8:
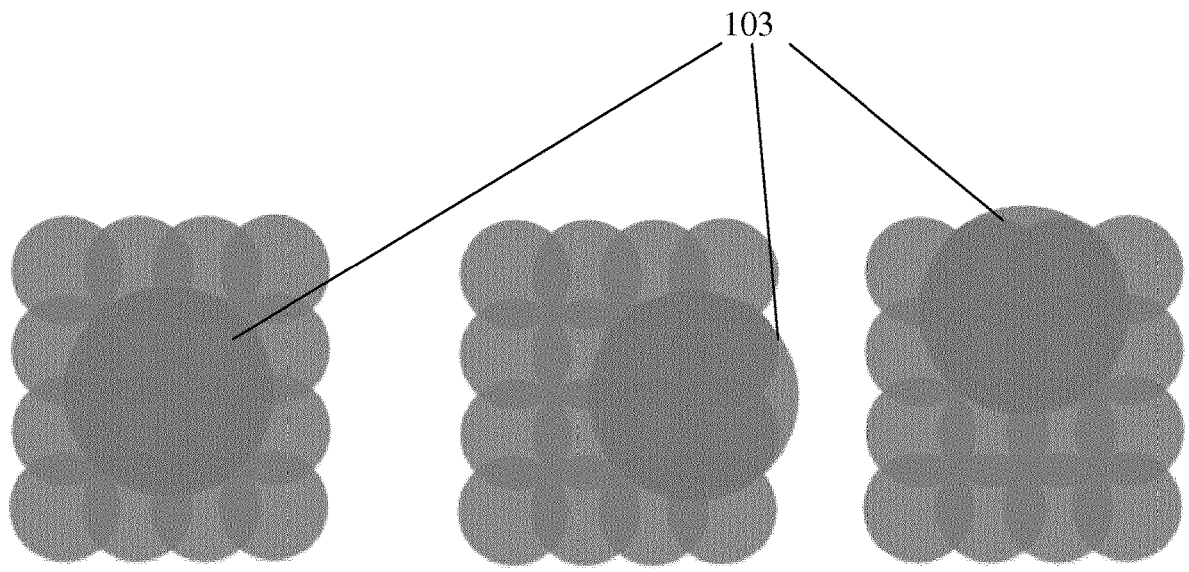
FIG. 8 illustrates some examples of alignments between a receiver coil and a plurality of transmitter coils.

In some embodiments, the power transmitter may comprise a plurality of transmitter coils and the test generator 211 may be arranged to generate test signals for the plurality of transmitter coils. In such cases, the responses to different transmitter coil 103 may provide additional information which may be very useful for estimating the position. An example of a planar arrangement of a plurality of transmitter coils is shown in FIG. 8 which also illustrates different positions of the power receiver 105.

For example, in some embodiments, the same test signal may be applied to all the transmitter coils and the resulting parameter values may be estimated e.g. based on the detected power of the drive signal, the induced voltage reported by the power receiver etc., as described previously.

In other embodiments, at least some test parameter values may be generated for individual subsets of the transmitter coils, e.g. by measuring the individual power levels for individual subsets. This may provide additional information, for example the power loss measure will be higher for subsets of transmitter coils proximal to the power receiver than for transmitter coils that are more remote from the power receiver. Such spatial variations will be reflected in the corresponding calibration parameters as these may be generated by performing the same tests for different positions of the calibration power receiver.

In some embodiments, the power transmitter may further perform a test wherein different test signals are applied to different transmitter coils, including not providing any drive signal to one or more transmitter coils. The test generator 211 may in some embodiments generate a sequence of sets of test signals where the different sets comprise different test signals for different transmitter coils. The test generator 211 may sequentially apply the test signal sets such that a series of test parameter measures are generated. For example, a constant frequency signal may be applied to some transmitter coils whereas a frequency sweep may be applied to other transmitter coils. The calibration data may be generated by performing the same test during the calibration phase and thus additional information may be generated and used for the position estimation.

In some embodiments, at least some of the sets comprise test signals for different subsets of the transmitter coils. Thus, in some cases, only a subset of the transmitter coils may be driven to generate the electromagnetic test signal with the subset changing between sets. Accordingly, the spatial characteristics of the electromagnetic test signal may be changed sequentially by changing the effective topology of the test arrangement. For example, the test generator 211 may sequentially drive only one transmitter coil until all transmitter coils have been driven once. For each transmitter coil, a subset of test parameter measures (power loss measure, resonance frequency measure, coupling factor measure) may be generated and a combined set of test parameter values may be generated by combining all the subsets. The resulting combined test parameter set may then be compared to corresponding calibration parameter sets generated during a calibration phase.

It will be appreciated that the estimated position can be used for many different purposes and in many different applications, and that the specific use will depend on the preferences and requirements of the individual embodiment. For example, in some embodiments, it may be used to provide accurate user feedback which can be used to improve the positioning. In other embodiments, it may e.g. be used to prevent potentially risky situations where the power transfer signal can induce currents in metallic objects but reducing the maximum power level if it is detected that the position of the power receiver is such that there could potentially be space for such objects close to the transmitter coil. In other embodiments, the position/misalignment estimate may be used to compensate other operations, such as e.g. the communication and specifically detection of the load modulation by the power receiver.

In the following a specific more detailed example of the operation of a wireless transfer system according to the previously described principles will be described. The examples are also reflected in FIG. 9 which shows a flow chart for a calibration phase and FIG. 10 which shows a flow chart for a test phase by a power transmitter.

In the example, a factory calibration step which is typically done in a factory, considers a receiver (with disconnected load) and a known transmitter such as a reference transmitter as described in the wireless power transfer specification document.

For various coil driving topologies of the power transmitter, such as coil activation, power transmitter coil drive current, voltage and operating frequency and separation distance $d_{tx-rx}$, we set various $d_{mis}$ (x,y) misalignment values and measure various parameters of interest of the wireless power transfer system. The parameters of interest include a power loss measure, a frequency resonance measure, and a coupling measure.

For every coil topology, power transmitter coil activation, power transmitter coil drive current, voltage, operating frequency and $d_{tx-rx}$ and $d_{mis}$ setting, measurements are performed and the above mentioned parameters of interest are recorded. These set of values provide the finger print of the wireless transfer system for a given coil topology, namely coil activation, coil drive current, voltage, operating frequency, $d_{tx-rx}$ and $d_{mis}$ setting. Once the calibration is done, a database of calibration data is created, and this is then loaded onto internal memory of the corresponding power receiver and power transmitter.

Next, based on the database information and the current positioning of the power receiver on the power transmitter, the power transmitter applies a set of input stimulus such as power transmitter coil current, voltage and operating frequency and perform multiple measurements and record various parameters of interest for each setting. The set of measurements is compared with the database information for corresponding input parameters namely $d_{tx-rx}$, coil topology, power transmitter drive current, voltage and operating frequency. The $d_{mis}$ value, namely x and y misalignment, for which the measured parameters of interest are closest to the values in the database for a given input setting is computed using e.g. well known machine learning. The algorithm may be run on an embedded processor on the power transmitter.

In case of a multiple power transmitter coil setup as shown, another measurement dimension is added. We can activate only one of the power transmitter coil or we can activate multiple coils. So, if there are N coils, then we can have $^NC_r$ combinations of coil activation scenarios.

For each drive power transmitter coil activation and x,y,z distance metric, we can set various coil current, voltage and frequency by varying the duty cycle and clock frequency to the inverter in the driver.

For each of these coil activation topologies and drive current, voltage, frequency settings, we can then perform the measurement of the parameters of interest and build a three dimensional matrix with values corresponding to the scenario.

Figure 9:
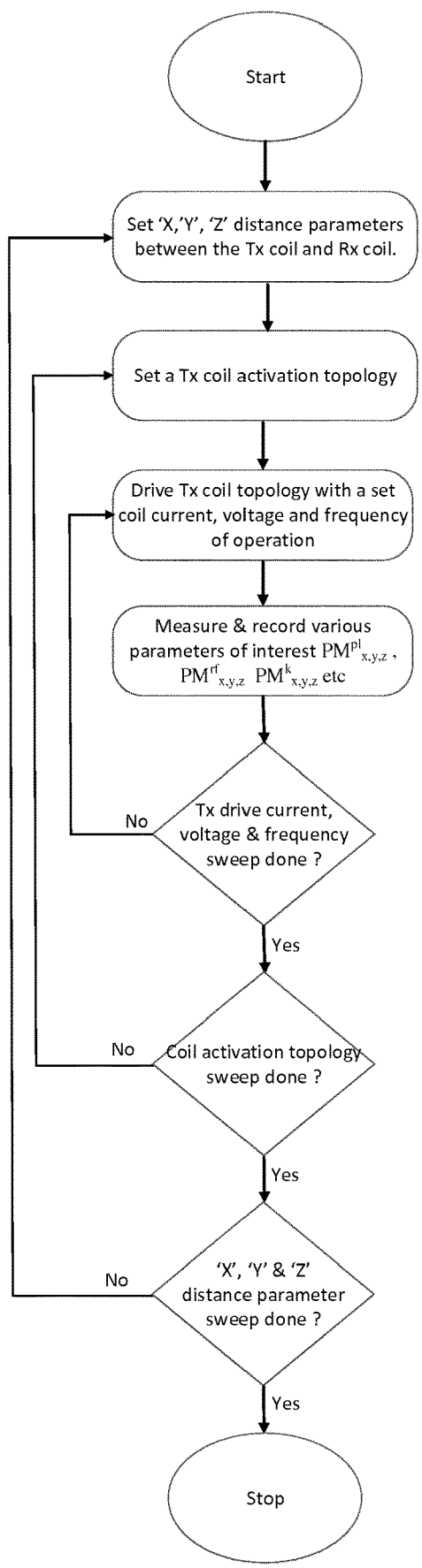
FIG. 9 illustrates an example of elements of a method of determining calibration parameters in accordance with some embodiments of the invention.

FIG. 9 shows the measurement flow chart for a N coil power transmitter and a single coil power receiver for various x, y and z distance, coil current, voltage and frequency and coil activation scenarios.

The input sweep parameters for the characterization are
 1. Coil activation topology (which combination of coils to activate)
 2. Input frequency
 3. Input Voltage
 4. Coil current
 5. 'X', 'Y' and 'Z' distance The creation of measurement database forms the first step in the determination of misalignment of power transmitter and power receiver coil estimation in field. Once the measurement database is created for a known power transmitter and power receiver pair, this data base information is stored on each corresponding power transmitter and power receiver during manufacturing in the factory, or can e.g. be downloaded from a remote server onto power transmitter and power receiver once configured in the field.

In the field, when a power receiver is placed on a power transmitter for the first time, the power receiver and power transmitter establish communication and identify one another. After the identification step, the power transmitter requests the $d_{rx}$ value from the power receiver and computes the 'z' value. The measurement database for the corresponding power transmitter and power receiver pair is loaded in the power transmitter and power receiver. and the misalignment estimation process begins. The power transmitter sets a coil topology, sets a coil current drive current, voltage and operating frequency. The power transmitter then performs various measurements and computes various parameters of interest such as $PM^{pi}_{x,y,z}$, $PM^{rf}_{x,y,z}$, $PM^{\kappa}_{x,y,z}$ etc.

The power transmitter can then set a different coil topology or different drive current, voltage and frequency and repeat the measurements and record them.

With this set of multiple measurements, for various input parameters such as coil activation topology, drive current, voltage and operating frequency, a search algorithm is executed in the measurement database to look for 'x,y' entry whose parameters of interest measured and recorded in the factory calibration is closest to the measured values.

The closest matching 'x,y' values for which the parameters of interest in the data base and measurement data match is e.g. determined using well known machine learning algorithms.

Figure 10:
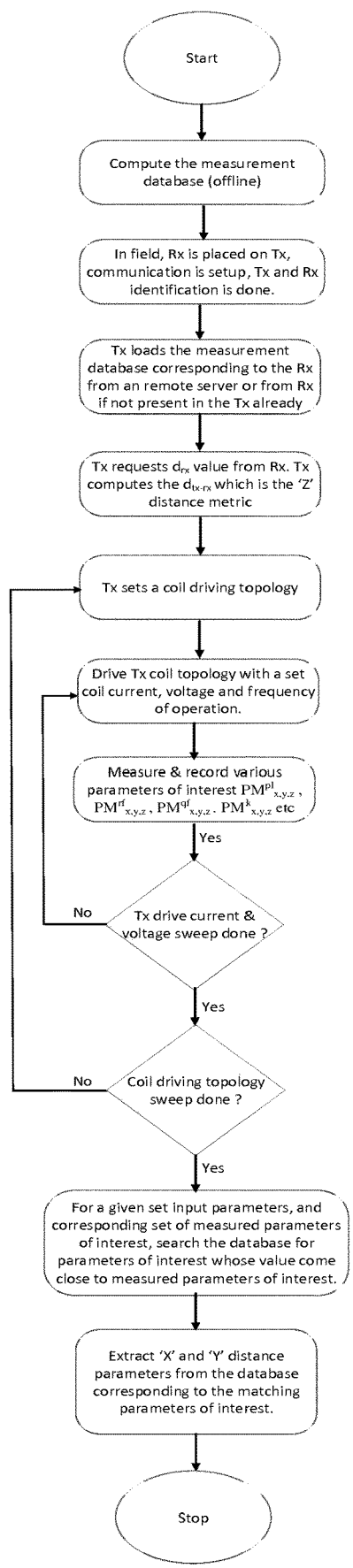
FIG. 10 illustrates an example of elements of a method of estimating a relative position of a power receiver in accordance with some embodiments of the invention.

The estimated value of 'x,y' is extracted from the measurement database. FIG. 10 shows an example of a flow chart for estimating the misalignment of power transmitter and power receiver coil by a power transmitter.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

It will be appreciated that the reference to a preferred value does not imply any limitation beyond it being the value determined in the foreign object detection initialization mode, i.e. it is preferred by virtue of it being determined in the adaptation process. The references to a preferred value could be substituted for references to e.g. a first value.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A power transmitter for wirelessly providing power to a power receiver the power transmitter comprising:
 at least one transmitter coil, wherein the at least one transmitter coil is arranged to generate a power transfer signal during power transfer;
 a retriever circuit,
  wherein the retriever circuit is arranged to retrieve calibration data,
  wherein the calibration data comprises a set of calibration parameters for each of a plurality of spatial positions,
  wherein each of the plurality of spatial positions is a positions of a calibration receiver relative to a calibration transmitter,
  the calibration parameters comprising:
   a calibration power loss measure for the calibration power receiver;
   a calibration resonance frequency measure indicative of a resonance circuit of the calibration power transmitter for the calibration power receiver; and
   a calibration coupling measure indicative of a coupling between the calibration transmitter and the calibration receiver;
 a test generator, wherein the test generator is arranged to generate a test drive signal for the at least one transmitter coil such that the at least one transmitter coil generates an electromagnetic test signal;
 a test processor circuit, wherein the test processor circuit is arranged to determine a set of test parameters in response to the test drive signal, the test parameters comprising:
   a test power loss measure indicative of a power extracted from the electromagnetic test signal;
   a test resonance frequency measure for a resonance circuit, wherein the resonance circuit comprises the at least one transmitter coil; and
   a test coupling measure indicative of a coupling between the power transmitter and the power receiver, the test power loss measure, the test resonance frequency measure, and the test coupling measure, wherein an interrelationship between the test power loss measure, the test resonance frequency measure, and the test coupling measure provides an additional indication of the position of the power receiver relative to the power transmitter; and
 a position estimator circuit, wherein the position estimator circuit is arranged to estimate the position of the power receiver relative to the power transmitter in response to a comparison of the test parameters to the calibration parameters.

2. The power transmitter of claim 1,
 wherein the position estimator circuit is arranged to determine a perpendicular distance measure,
 wherein the perpendicular distance measure is indicative of a distance between the at least one transmitter coil and a receiver coil of the power receiver in a direction perpendicular to a contact surface for receiving the power receiver,
 wherein the position estimator circuit is arranged to determine the position of the power receiver in response to a comparison of the perpendicular distance measure to the plurality of spatial positions of a calibration receiver.

3. The power transmitter of claim 1, further comprising a communicator circuit,
wherein the communicator circuit is arranged to receive messages from the power receiver,
wherein the communicator circuit is arranged to receive a power receiver distance indicator,
wherein the power receiver indicator is indicative of a distance from the receiver coil to an external surface of the power receiver,
wherein the position estimator circuit is arranged to determine the perpendicular distance measure in response to the power receiver distance indicator.

4. The power transmitter of claim 1, further comprising a communicator circuit,
wherein the communicator circuit is arranged to receive messages from the power receiver,
wherein the communicator circuit is arranged to receive a power receiver identification indication from the power receiver,
wherein the retriever circuit is arranged to retrieve a portion of the calibration data,
wherein the portion of the calibration data matches the power receiver identification indication.

5. The power transmitter of claim 4,
wherein the retriever circuit is arranged to retrieve the calibration data from a remote source by transmitting a calibration data request message to the remote source,
wherein the calibration data request message comprises an identification indication,
wherein the identification indication corresponds to the power receiver identification indication.

6. The power transmitter of claim 1, further comprising a communicator circuit,
wherein the communicator circuit is arranged to receive data from the power receiver,
wherein the retriever circuit is arranged to receive the calibration data from the power receiver.

7. The power transmitter of claim 1,
wherein at least a portion of the calibration parameters are provided for a calibration power receiver,
wherein the calibration power receiver has a disconnected load.

8. The power transmitter of claim 1, wherein at the calibration data is provided for a reference power transmitter.

9. The power transmitter of claim 8, wherein the position estimator circuit is arranged to modify at least one of at least one calibration parameter and a test parameter in response to a difference between a property of the power transmitter and a property of the reference power transmitter.

10. The power transmitter of claim 1,
wherein the test generator is arranged to generate a plurality of different test signals,
wherein the calibration data comprises a plurality of calibration parameters for different test signals for one spatial position.

11. The power transmitter of claim 1, further comprising a plurality of transmitter coils including the at least one transmitter coil, wherein the test generator is arranged to generate test signals for the plurality of transmitter coils.

12. The power transmitter of claim 11,
wherein the test generator is arranged to generate a sequence of sets of test signals,
wherein each of the sets of test signals comprise different test signals for different transmitter coils of the plurality of transmitter coils, and
wherein the calibration data comprises a plurality of calibration parameters for different sets of test signals for one spatial position.

13. The power transmitter of claim 12, wherein at least two sets of the sets of test signals comprise test signals for different subsets of the transmitter coils.

14. The power transmitter of claim 1, wherein the position estimator circuit is arranged to estimate at least two dimensions for the position of the power receiver.

15. A method of operation for a power transmitter wirelessly providing power to a power receiver via a transmitter coil the method comprising:
retrieving calibration data,
wherein the calibration data comprises a set of calibration parameters for each of a plurality of spatial positions,
wherein each of the plurality of spatial positions is a positions of a calibration receiver relative to a calibration transmitter,
the calibration parameters comprising:
a calibration power loss measure for the calibration power receiver;
a calibration resonance frequency measure indicative of a resonance circuit of the calibration power transmitter for the calibration power; and
a calibration coupling measure indicative of a coupling between the calibration transmitter and the calibration receiver;
generating a test drive signal for the transmitter coil such that the transmitter coil generates an electromagnetic test signal;
determining a set of test parameters in response to the test drive signal, the test parameters comprising:
a test power loss measure indicative of a power extracted from the electromagnetic test signal;
a test resonance frequency measure for a resonance circuit, wherein the resonance circuit comprises the transmitter coil; and
a test coupling measure indicative of a coupling between the power transmitter and the power receiver, the test power loss measure, the test resonance frequency measure, and the test coupling measure, wherein an interrelationship between the test power loss measure, the test resonance frequency measure, and the test coupling measure provides an additional indication of the position of the power receiver relative to the power transmitter; and
estimating the position of the power receiver relative to the power transmitter in response to a comparison of the test parameters to the calibration parameters for the plurality of spatial positions.

16. The method of claim 15, further comprising:
determining a perpendicular distance measure, wherein the perpendicular distance measure is indicative of a distance between the transmitter coil and a receiver coil of the power receiver in a direction perpendicular to a contact surface for receiving the power receiver;
determining the position of the power receiver in response to a comparison of the perpendicular distance measure to the plurality of spatial positions of a calibration receiver.

17. The method of claim 15, further comprising:
receiving messages from the power receiver;
receiving a power receiver distance indicator, wherein the power receiver indicator is indicative of a distance from the receiver coil to an external surface of the power receiver; and
determining the perpendicular distance measure in response to the power receiver distance indicator.

18. The method of claim 15, further comprising:
receiving messages from the power receiver;
receiving a power receiver identification indication from the power receiver; and
retrieving a portion of the calibration data,
wherein the portion of the calibration data matches the power receiver identification indication.

19. The method of claim 18, further comprising, retrieving the calibration data from a remote source by transmitting a calibration data request message to the remote source,
wherein the calibration data request message comprises an identification indication,
wherein the identification indication corresponds to the power receiver identification indication.

20. A computer program stored on a non-transitory medium, wherein the computer program when executed on a processor performs the method as claimed in claim 15.

* * * * *